(12) United States Patent
Endo et al.

(10) Patent No.: US 10,655,005 B2
(45) Date of Patent: May 19, 2020

(54) EPOXY RESIN COMPOSITION

(71) Applicant: ADEKA CORPORATION, Tokyo (JP)

(72) Inventors: Takeshi Endo, Fukuoka (JP); Kozo Matsumoto, Fukuoka (JP); Ken-ichi Tamaso, Saitama (JP); Chihiro Asakura, Saitama (JP); Ryo Ogawa, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 105 days.

(21) Appl. No.: 15/560,773

(22) PCT Filed: Mar. 22, 2016

(86) PCT No.: PCT/JP2016/058944
§ 371 (c)(1),
(2) Date: Sep. 22, 2017

(87) PCT Pub. No.: WO2016/152839
PCT Pub. Date: Sep. 29, 2016

(65) Prior Publication Data
US 2018/0051167 A1 Feb. 22, 2018

(30) Foreign Application Priority Data
Mar. 23, 2015 (JP) .................................. 2015-059611

(51) Int. Cl.
*C08L 63/00* (2006.01)
*C08J 5/24* (2006.01)
*C08K 5/5399* (2006.01)
*C08K 5/00* (2006.01)

(52) U.S. Cl.
CPC ............. *C08L 63/00* (2013.01); *C08J 5/24* (2013.01); *C08K 5/0066* (2013.01); *C08K 5/5399* (2013.01); *C08L 2201/02* (2013.01)

(58) Field of Classification Search
None
See application file for complete search history.

(56) References Cited

U.S. PATENT DOCUMENTS

| | | | | | |
|---|---|---|---|---|---|
| 4,062,909 A | * | 12/1977 | Morgan | ............. | C07F 9/24 558/157 |
| 4,086,302 A | * | 4/1978 | Morgan | ............. | C07F 9/2425 558/157 |
| 4,124,400 A | * | 11/1978 | Morgan | ............. | C07F 9/242 106/18.16 |
| 4,134,877 A | * | 1/1979 | Morgan | ............. | C07F 9/242 106/18.17 |
| 4,144,394 A | * | 3/1979 | Morgan | ............. | C07F 9/24 544/84 |
| 4,401,777 A | * | 8/1983 | Tsuboi | ............. | C08G 59/4042 523/451 |
| 4,506,042 A | * | 3/1985 | Tsuboi | ............. | C08G 59/4042 523/424 |
| 6,297,332 B1 | * | 10/2001 | Urakami | ............. | C08G 59/688 428/620 |
| 9,738,667 B2 | * | 8/2017 | Endo | ............. | C07F 9/224 |
| 10,421,261 B2 | * | 9/2019 | Endo | ............. | C08K 5/5398 |
| 2016/0200747 A1 | * | 7/2016 | Endo | ............. | C07F 9/224 558/144 |
| 2018/0037014 A1 | * | 2/2018 | Endo | ............. | C08J 5/24 |
| 2018/0051167 A1 | * | 2/2018 | Endo | ............. | C08K 5/5399 |

FOREIGN PATENT DOCUMENTS

| | | |
|---|---|---|
| GB | 1435569 A | 5/1976 |
| GB | 1435570 A | 5/1976 |
| JP | S49052496 A | 5/1974 |
| JP | 2000017055 A | 1/2000 |
| JP | 2008045025 A | 2/2008 |
| JP | 2012025917 A | 2/2012 |
| WO | 2005012415 A1 | 2/2005 |
| WO | 2015049965 A1 | 4/2015 |

OTHER PUBLICATIONS

International Search Report for PCT/JP2016/058944 dated Jun. 21, 2016.
English Abstract of JP-2012025917, Publication Date: Feb. 9, 2012.
English Abstract of WO-2005012415, Publication Date: Feb. 10, 2005.
English Abstract of JP2000017055, Publication Date: Jan. 18, 2000.
English Abstract of JP2008045025, Publication Date: Feb. 28, 2008.
Search Report for corresponding EP appl. 16768742 dated Oct. 23, 2018 (pp. 1-3).

* cited by examiner

*Primary Examiner* — Joseph D Anthony
(74) *Attorney, Agent, or Firm* — Millen, White, Zelano & Branigan, PC; Ryan Pool

(57) ABSTRACT

An epoxy resin composition comprising an epoxy resin (A), a curing agent (B) and a phosphorous-containing compound (C) indicated by the following general formula (1) and also, if necessary, a flame retardant (D), and a laminated plate comprising said resin composition;

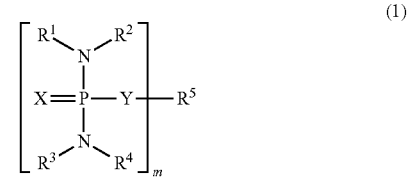

(1)

wherein m indicates an integer from 2 to 10, $R^1$ to $R^4$ each independently indicate a hydrogen atom, an alkyl group or an aryl group, $R^5$ indicates a hydrocarbon group that may contain an oxygen atom, a sulfur atom or a nitrogen atom, X indicates an oxygen atom or a sulfur atom, Y indicates an oxygen atom, a sulfur atom or —$NR^6$—, and $R^6$ indicates a hydrogen atom, an alkyl group or an aryl group.

10 Claims, No Drawings

EPOXY RESIN COMPOSITION

TECHNICAL FIELD

The present invention relates to an epoxy resin composition, and, in particular, relates to an environmentally-adapted excellent epoxy resin composition containing a specific phosphorous reactive compound in order to improve a glass-transition temperature (Tg) of a cured material, and, also relates to a laminated plate using said epoxy resin composition.

BACKGROUND ART

Although epoxy resin has been industrially used in a wide range of areas, performances for epoxy resin have been more and more highly required in recent years along with the development of industry. For example, epoxy resins have been conventionally used for a copper-clad laminated plate for electronics parts and electronics devices, and a sealing agent etc. to form a semiconductor package. In order to enhance the credibility of thermal shock, it is required that the Tg. (glass-transition temperature) of a cured material of the epoxy resin should be more highly improved. In addition, from the viewpoint of taking safety into consideration such as a fire prevention and a fire spread retardation, and also from the viewpoint of coping with an environmental problem, the epoxy resin, which has a flame-retardant effect without using the conventionally used halogen, has been actively developed.

For example, as for the production of a prepreg for manufacturing a multilayer laminated plate, the prepreg having the improved Tg is proposed which is obtained by adding a solid melamine having three amino groups in an epoxy resin composition (Patent document 1). However, in cases where the crosslink density of the cured epoxy resin material is improved to raise the Tg, by incorporating the melamine that is a trifunctional material in this way. there was a disadvantage in that molding properties of prepreg are poor, for the reason that the dispersing properties of the melamine, when the prepreg is manufactured, is poor since the melamine is solid.

In addition, a one-component epoxy resin composition using a trifunctional epoxy resin (having three epoxy groups) is proposed as a filler for plugging a through hole of a printed wiring substrate (Patent document 2). In this case, a large amount of inorganic filler required for decreasing the linear expansion coefficient of cured material can be added if a liquid low-viscosity epoxy resin is used, and workability can be excellent, however, the epoxy resin cured material having a satisfactory Tg could not be obtained.

Moreover, all of the aforementioned epoxy resins had unsatisfying evaluations concerning flame retardancy. On the other hand, as a means of improving the flame retardancy of epoxy resin, a method for adding phosphate esters in the epoxy resin is also known (Patent document 3). The flame retardancy of the epoxy resin is improved to some extent by this method. However, since the added phosphate ester does not have reactive properties with other components in the epoxy resin, there was a disadvantage in that a bleed phenomenon in which a part of the phosphate ester is liberated when the epoxy resin is cured occurs, or the Tg of a cured material markedly drops.

PRIOR ART DOCUMENTS

Patent Documents

Patent document 1: JP 2010-215858 A
Patent document 2: JP 2005-255793 A
Patent document 3: JP 2009-235449 A

SUMMARY OF THE INVENTION

Problem to be Solved by the Invention

Therefore, the first object of the present invention is to provide an epoxy resin composition wherein not only workability and molding properties are excellent but also the Tg of a cured material is improved.

The second object of the present invention is to provide a laminated plate obtained by using the epoxy resin composition having a high Tg of a cured material thereof.

Means for Solving the Problems

As a result of extensive studies to accomplish the aforementioned objects, the inventors of the present invention have found that, by using a specific phosphorus-containing compound having reactive properties with an epoxy group, an epoxy resin composition having excellent workability and molding properties can be obtained wherein not only raw materials in the epoxy resin composition are not crystallized, but also a cured material has a high Tg, thereby achieving the present invention.

Namely, the present invention is an epoxy resin composition comprising an epoxy resin (A), a curing agent (B) and a phosphorous-containing compound (C) indicated by the following general formula (1), and a laminated plate obtained by using said epoxy resin composition.

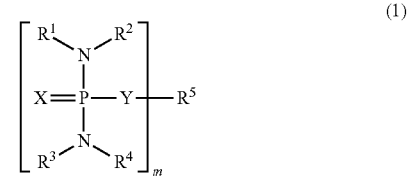

wherein m indicates an integer from 2 to 10, $R^1$ to $R^4$ each independently indicate a hydrogen atom, an alkyl group or an aryl group, $R^5$ indicates a hydrocarbon group that may contain an oxygen atom, a sulfur atom or a nitrogen atom, X indicates an oxygen atom or a sulfur atom, Y indicates an oxygen atom, a sulfur atom or —$NR^6$—, and $R^6$ indicates a hydrogen atom, an alkyl group or an aryl group.

Effect of the Invention

The epoxy resin composition of the present invention has not only excellent workability and molding properties, but also the cured material thereof has a high Tg, therefore, a laminated plate of the present invention that is manufactured by using the composition of the present invention has excellent thermal resistance, manufacturing adaptability and environmental adaptability. In addition, in the case of using a flame retardant together, a laminated plate having high flame retardancy can be obtained, wherein excellent workability and molding properties are kept.

MODES FOR CARRYING OUT THE INVENTION

Hereinafter, each constituent feature of an epoxy resin (A), a curing agent (B) and a phosphorous-containing compound (C) used for the epoxy resin composition of the present invention will now be described. However, the present invention should not be construed as being limited to these descriptions, but inventions easily obtained by a person skilled in the art based on these descriptions are also included in the present invention.

Moreover, the use applications of the epoxy resin composition of the present invention are not limited in particular. For example, the epoxy resin composition of the present invention can be used for a laminated plate used for an electronic circuit substrate, a sealing agent used for electronic parts, a cast molding material, a film material, an adhesive agent, an electric insulating paint, a composite material requiring flame retardancy and a powdery paint. In the present invention, it is preferable to be used for a laminated plate used for an electronic circuit substrate, a sealing agent used for electronic parts and a cast molding material, and it is most preferable to be used for a laminated plate.

The epoxy resin (A) used in the present invention is not particularly limited in molecular structure and molecular weight etc., as long as the epoxy resin has at least two epoxy groups in a molecule. It is possible to select as appropriate from publicly known epoxy resins, however, it is preferable to vary these epoxy resins to be used, case by case, depending on different use applications.

Examples of the aforementioned epoxy resin are, for example, bisphenol type epoxy resins such as bisphenol A type epoxy resins and bisphenol F type epoxy resins; biphenyl type epoxy resins such as biphenyl type epoxy resins and tetramethyl biphenyl type epoxy resins; dicyclopentadiene type epoxy resins; naphthalene type epoxy resins; alicyclic epoxy resins obtained from cyclohexane dimethanols and hydrogenated bisphenol A etc.; novolac type epoxy resins such as phenol novolac type epoxy resins, cresol novolac type epoxy resins, bisphenol A novolac type epoxy resins, an epoxidized materials which are condensation products of phenols with aromatic aldehydes having phenolic hydroxyl group(s), and biphenyl novolac type epoxy resins; triphenyl methane type epoxy resins; tetraphenyl ethane type epoxy resins; additional reaction type epoxy resins of dicyclopentadiene and phenol; and phenol aralkyl type epoxy resins.

The aforementioned epoxy resins may be used alone, or two or more of them may be used together. However, in respect of an epoxy resin composition used for a laminated plate, it is preferable to use novolac type epoxy resins and/or bisphenol type epoxy resins.

In respect of an epoxy resin composition used for a sealing agent, it is preferable to use at least one of epoxy resin selected from bisphenol type epoxy resins, dicyclopentadiene type epoxy resins, novolac type epoxy resins and naphthalene type epoxy resins. In respect of an epoxy resin composition used for a cast molding material, it is preferable to use bisphenol type epoxy resin and/or alicyclic epoxy resins.

In the present invention, a reactive diluent can be used together in order to adjust the epoxy resin (A) used so as to be a desired viscosity. As such reactive diluents, from the viewpoint of suppressing decrease of thermal resistance and a glass-transition temperature of cured material which is obtained when the epoxy resin composition of the present invention is cured, it is preferable to use the diluent having at least one epoxy group.

A number of epoxy groups contained in the aforementioned preferable reactive diluent may be one, or two or more. It is not limited in particular.

Examples of a reactive diluent wherein a number of epoxy groups is one are, for example, n-butyl glycidyl ether, $C_{12}$-$C_{14}$ alkyl glycidyl ether, allyl glycidyl ether, 2-ethylhexyl glycidyl ether, styrene oxide, phenyl glycidyl ether, cresyl glycidyl ether, p-sec-butylphenyl glycidyl ether, t-butylphenyl glycidyl ether, glycidyl methacrylate and tertiary carboxylic acid glycidyl ester.

Examples of a reactive diluent wherein a number of epoxy groups is two are, for example, ethylene glycol diglycidyl ether, propylene glycol diglycidyl ether, butanediol diglycidyl ether, 1,6-hexanediol diglycidyl ether and neopentyl glycol diglycidyl ether.

Examples of a reactive diluent wherein a number of epoxy groups is three are, for example, trimethylol propane triglycidyl ether and glycerin triglycidyl ether.

The blending amount of the aforementioned reactive diluent with epoxy resin (A) is not limited in particular, however, it is preferable to vary the amount of reactive diluent used case by case, depending on different use applications.

In the case of an epoxy resin composition used for a laminated plate, it is preferable not to use a reactive diluent, from the viewpoint of avoiding a decrease in glass-transition temperature of products.

In the case of an epoxy resin composition used for a sealing agent or a cast molding material, it is preferable to blend 3 to 50 parts by mass of reactive diluent relative to 100 parts by mass of epoxy resin (A), but it is more preferable to blend 5 to 30 parts by mass.

Examples of a curing agent (B) used for the present invention are phenol resins, aliphatic amines, aromatic amines, latent curing agents and acid anhydrides. In the present invention, it is preferable to vary these curing agents used case by case, depending on different use applications.

Specifically, as for a use for a laminated plate, it is preferable to use phenol resins or latent curing agents, but it is more preferable to use a phenol novolac resin, a cresol novolac resin or a dicyandiamide type latent curing agent.

As for a use for a sealing agent, it is preferable to use latent curing agents or acid anhydrides. As for a use for a cast molding material, it is preferable to use aliphatic amines, aromatic amines or acid anhydrides. These curing agents may be used alone or two or more of them may be used together.

Examples of the aforementioned phenol resins are polyphenol compounds such as a phenol novolac resin, a cresol novolac resin, an aromatic hydrocarbon formaldehyde resin-modified phenol resin, a dicyclopentadiene-phenol adduct resin, a phenol aralkyl resin (xylok resin), a naphthol aralkyl resin, a trisphenylol methane resin, a tetraphenylol ethane resin, a naphthol novolac resin, a naphthol-phenol co-condensed novolac resin, a naphthol-cresol co-condensed novolac resin, a biphenyl-modified phenol resin (a polyphenol compound wherein a phenol nucleus is linked with a bismethylene group), a biphenyl-modified naphthol resin (a polyvalent naphthol compound wherein a phenol nucleus is linked with a bismethylene group), an amino triazine-modified phenol resin (a compound which has a phenol skeleton, a triazine ring and a primary amino group in a molecular structure), and an alkoxy group-contained aromatic ring-modified novolac resin (a polyphenol compound wherein a phenol nucleus and an alkoxy group-contained aromatic ring are linked with formaldehyde).

The blending amount of said curing agent (B) consisting of phenol resins for the epoxy resin (A) is not limited in particular, however, it is preferable to blend the curing agent so that there are 0.3 to 1.5 hydroxyl groups contained in phenol resins, relative to one epoxy group contained in all compounds having an epoxy group, but it is more preferable to blend the curing agent so that there are 0.8 to 1.2 hydroxyl groups relative to one epoxy group.

Examples of the aforementioned aliphatic amines are ethylene diamine, hexamethylene diamine, 1,4-diaminocyclohexane, 1,3-diaminocyclohexane, 4,4'-diaminodicyclohexyl methane, 1,3-bis(aminomethyl)cyclohexane, 1,4-bis(aminomethyl)cyclohexane, 4,4'-diaminodicyclohexyl propane, bis(4-aminocyclohexyl) sulfone, 4,4'-diaminodicyclohexyl ether, 2,2'-dimethyl-4,4'-diaminodicyclohexane, 4,4'-diaminodicyclohexane, isophoronediamine, norbornene diamine and meta-xylene diamine. These aliphatic amines may be used alone or may be used as a mixture obtained by mixing these aliphatic amines as appropriate.

Examples of the aforementioned aromatic amines are diethyl toluenediamine, 1-methyl-3,5-diethyl-2,4-diaminobenzene, 1-methyl-3,5-diethyl-2,6-diaminobenzene, 1,3,5-triethyl-2,6-diaminobenzene, 3,3'-diethyl-4,4'-diaminodiphenylmethane and 3,5,3',5'-tetramethyl-4,4'-diaminodiphenyl methane. These aromatic amines may be used alone or may be used as a mixture obtained by mixing these aromatic amines in an arbitrary proportion.

The blending amount of said curing agent (B) consisting of the aforementioned aliphatic amines or aromatic amines with the epoxy resin (A) is not limited in particular, however, it is preferable to blend the curing agent so that there are 0.6 to 1.5 active hydrogens contained in the aforementioned amines, relative to one epoxy group contained in all compounds having an epoxy group, but it is more preferable to blend curing agent (B) so that there are 0.8 to 1.2 active hydrogens relative to one epoxy group.

Examples of the aforementioned latent curing agent are latent curing agents such as a dicyandiamide type compound, an imidazole type compound and a polyamine type compound which, when mixed with epoxy resin at room temperature, do not bring a large viscosity change and physical property change to the mixture. Among these, particularly preferable latent curing agents include ADEKA HARDENER EH-3636AS (a dicyandiamide type latent curing agent manufactured by ADEKA CORPORATION), ADEKA HARDENER EH-4351S (a dicyandiamide type latent curing agent manufactured by ADEKA CORPORATION), ADEKA HARDENER EH-5011S (an imidazole type latent curing agent manufactured by ADEKA CORPORATION), ADEKA HARDENER EH-5046S (an imidazole type latent curing agent manufactured by ADEKA CORPORATION), ADEKA HARDENER EH-4357S (a polyamine type latent curing agent manufactured by ADEKA CORPORATION), ADEKA HARDENER EH-5057P (a polyamine type latent curing agent manufactured by ADEKA CORPORATION) and ADEKA HARDENER EH-5057PK (a polyamine type latent curing agent manufactured by ADEKA CORPORATION), which are all sold on the open market. These can be used alone or can be used as a mixture obtained by mixing them as appropriate.

The blending amount of said curing agent (B), consisting of the aforementioned latent curing agents, with the epoxy resin (A) is not limited in particular, however, it is preferable to use 1 to 70 parts by mass of said curing agent (B) relative to 100 parts by mass of all compounds having an epoxy group, but it is more preferable to use 3 to 60 parts by mass of said curing agent (B).

Examples of the aforementioned acid anhydrides are a himic anhydride, a phthalic anhydride, a maleic anhydride, a methyl himic anhydride, a succinic anhydride, a tetrahydro phthalic anhydride, a hexahydro phthalic anhydride, a methyl tetrahydro phthalic anhydride, a methyl hexahydro phthalic anhydride, a trialkyl tetrahydro phthalic anhydride-maleic anhydride addition product, a benzophenone tetracarboxylic anhydride, a trimellitic anhydride, a pyromellitic anhydride and a hydrogenated methyl nadic anhydride.

The blending amount of said curing agent (B) consisting of the aforementioned acid anhydrides, with the epoxy resin (A) is not limited in particular, however, it is preferable that 0.7 to 1.6 acid anhydride groups exist in acid anhydrides relative to one epoxy group existing in all compounds having the epoxy group, but it is more preferable that 0.9 to 1.2 acid anhydride groups are introduced by the acid anhydrides per one epoxy group.

In the present invention, publicly known epoxy resin curing accelerators can be used together with the aforementioned curing agent (B), if necessary. Specific examples of these curing accelerators are a phosphine compound such as triphenyl phosphine; a phosphonium salt such as tetraphenyl phosphonium bromide; imidazoles such as 2-methyl imidazole, 2-phenyl imidazole, 2-ethyl-4-methyl imidazole, 2-undecyl imidazole and 1-cyanoethyl-2-methyl imidazole; imidazole salts which are formed by the aforementioned imidazoles with trimellitic acid, isocyanuric acid or boric acid; amines such as benzil dimethylamine and 2,4,6-tris (dimethylaminomethyl)phenol; quarternary ammonium salts such as trimethyl ammonium chloride; and a complex compound comprised of boron trifluoride with amines or ether compounds etc. These curing accelerators may be used alone or two or more of them may be used together.

The amount of the aforementioned curing accelerator used is not limited in particular, however, it is preferable that it is 0.1 to 10 parts by mass relative to 100 parts by mass of epoxy resin (A) used, but 0.5 to 5 parts by mass is even more preferable.

Next, a phosphorus-containing compound of the component (C) indicated by the following general formula (1), which is used in the present invention, will be described.

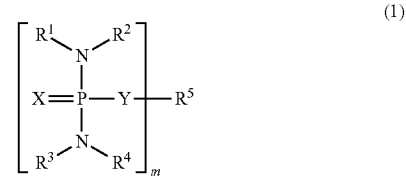

wherein m indicates an integer from 2 to 10, $R^1$ to $R^4$ each independently indicate a hydrogen atom, an alkyl group or an aryl group, $R^5$ indicates a hydrocarbon group which may contain an oxygen atom, a sulfur atom or a nitrogen atom, X indicates an oxygen atom or a sulfur atom, Y indicates an oxygen atom, a sulfur atom or $-NR^6-$, and $R^6$ indicates a hydrogen atom, an alkyl group or an aryl group.

The phosphorus-containing compound of the component (C) used in the present invention is a compound, which reacts with an epoxy group according to the reaction scheme shown in the following general formula (3).

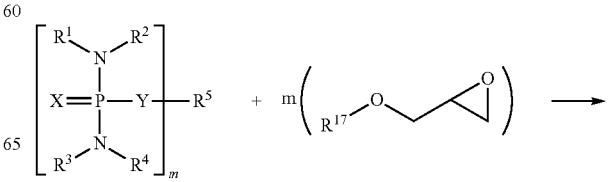

-continued

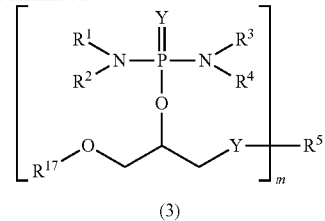

(3)

wherein m indicates an integer from 2 to 10, $R^1$ to $R^4$ each independently indicate a hydrogen atom, an alkyl group or an aryl group, $R^5$ indicates a hydrocarbon group which may contain an oxygen atom, a sulfur atom or a nitrogen atom, $R^{17}$ indicates an alkyl group or an aryl group, X indicates an oxygen atom or a sulfur atom, Y indicates an oxygen atom, a sulfur atom or —$NR^6$—, and $R^6$ indicates a hydrogen atom, an alkyl group or an aryl group.

In the aforementioned general formula (1), it is preferable that m is an integer from 2 to 7, but an integer from 2 to 5 is more preferable. Since only one functional group reacts with an epoxy group, and as a result, the glass-transition temperature and strength of a cured material obtained by curing the epoxy resin are markedly decreased, it is not preferable that m is 1. In the case that m is more than 10, it is difficult to manufacture the phosphorus-containing compound for the reason that, when the phosphorus-containing compound is manufactured, the viscosity thereof is increased, which is not preferable.

In the aforementioned general formula (1), it is preferable that X and Y are both oxygen atoms, since raw materials can be easily obtained at a low price.

Examples of alkyl group indicated by $R^1$ to $R^4$ in the aforementioned general formula (1) are, for example, a methyl group, an ethyl group, a propyl group, an isopropyl group, a butyl group, an isobutyl group, a tertiary butyl group, an amyl group, an isoamyl group, a tertiary amyl group, a hexyl group, an isohexyl group, an octyl group, a 2-ethylhexyl group, a tertiary octyl group, a nonyl group and a decyl group. Also, examples of aryl group indicated by $R^1$ to $R^4$ in the aforementioned general formula (1) are, for example, a phenyl group and a naphthyl group.

In the present invention, it is preferable that $R^1$ to $R^4$ are a hydrogen atom or an alkyl group having 1 to 6 carbon atoms among these, but it is more preferable that either of $R^1$ or $R^2$ is a hydrogen atom and the other is a methyl group or an ethyl group, and at the same time, either of $R^3$ or $R^4$ is a hydrogen atom and the other is a methyl group or an ethyl group.

Examples of hydrocarbon group indicated by $R^5$ in the aforementioned general formula (1) are, for example, alkyl groups such as a methyl group, an ethyl group, a propyl group, an isopropyl group, a butyl group, an isobutyl group, a tertiary butyl group, an amyl group, an isoamyl group, a tertiary amyl group, a hexyl group, an isohexyl group, an octyl group, a 2-ethylhexyl group, a tertiary octyl group, a nonyl group and a decyl group; aryl groups such as a phenyl group and a naphthyl group; alkane diyl groups such as a methylene group, an ethylene group, a propylene group, an ethane diyl group and an octane diyl group; alkane triyl groups such as a methylene triyl group (methine group) and a 1,1,2-ethylene triyl group (ethan-1,1,2-triyl group); an alkane tetrayl group such as a 1,1,2,2-ethylene tetrayl group (ethan-1,1,2,2-tetrayl group); mononuclear polyhydric phenol compounds such as hydroquinone, resorcin, pyrocatechol and phloroglucinol; and aromatic groups of polynuclear polyhydric phenol compounds such as dihydroxy naphthalene, biphenol, methylene bisphenol (bisphenol F), methylenebis(orthocresol), ethylidene bisphenol, isopropylidene bisphenol (bisphenol A), isopropylidenebis(orthocresol), tetrabromo bisphenol A, 1,3-bis(4-hydroxy cumyl benzene), 1,4-bis(4-hydroxy cumyl benzene), 1,1,3-tris(4-hydroxyphenyl)butane, 1,1,2,2-tetra(4-hydroxyphenyl)ethane, thiobisphenol, sulfonyl bisphenol, oxy bisphenol, phenol novolac, orthocresol novolac, ethylphenol novolac, butylphenol novolac, octylphenol novolac, resorcin novolac and terpene phenol.

From the viewpoint of physical properties of a cured material obtained by curing the epoxy resin composition of the present invention, it is preferable that the phosphorus-containing compound of the component (C) used in the present invention is a compound containing one aromatic ring, or two or more aromatic rings, in the skeleton, but it is more preferable that $R^5$ in the aforementioned formula (1) is a functional group indicated in the following general formulae (2-1), (2-2), (2-4), (2-5) or (2-6).

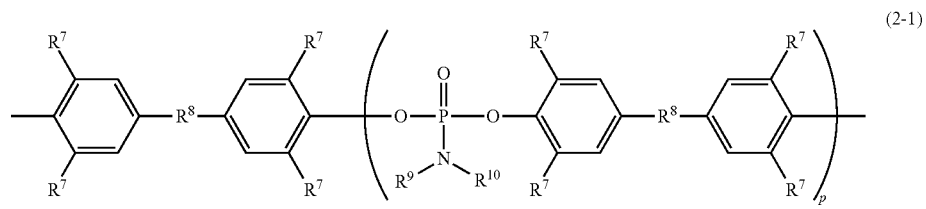

(2-1)

wherein p indicates an integer from 0 to 3, $R^7$ indicates a hydrogen atom or an alkyl group having 1 to 4 carbon atoms, $R^8$ indicates a single bond, a methylene group, or —$C(CH_3)_2$—, and $R^9$ and $R^{10}$ each independently indicate a hydrogen atom or an alkyl group having 1 to 6 carbon atoms.

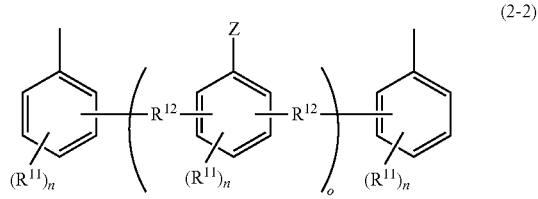

(2-2)

wherein n indicates an integer from 0 to 3, o indicates an integer from 0 to 50, $R^{11}$ indicates a hydrogen atom or an alkyl group having 1 to 4 carbon atoms, $R^{12}$ indicates a hydrocarbon group which may contain an oxygen atom or a sulfur atom, and Z is a hydroxyl group or a functional group indicated by the following general formula (2-3).

(2-3)

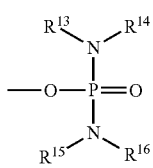

wherein $R^{13}$ to $R^{16}$ each independently indicate a hydrogen atom, or an alkyl group having 1 to 6 carbon atoms.

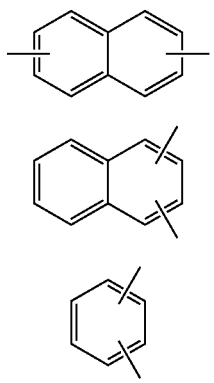

(2-4)

(2-5)

(2-6)

In the present invention, among the aforementioned compounds, a compound is preferable wherein $R^5$ is a functional group indicated by the aforementioned general formula (2-1) and $R^7$ is a hydrogen atom. But, for the reason that raw materials are inexpensive and from the viewpoint of being easily manufactured, it is particularly preferable that $R^8$ is a methylene group or $—C(CH_3)_2—$.

However, from the viewpoint of flame retardancy, it is particularly preferable that $R^8$ is a methylene group or a single bond.

In all the compounds indicated by the aforementioned formula (2-1) used in the present invention, it is preferable that the average value of p is 0 to 2 from the viewpoint of being easily manufactured, but 0 to 0.5 is more preferable. The reason is because it tends to be difficult to manufacture a phosphorus-containing compound when the average value of p is more than 3.

Since the flame retardancy of epoxy resin composition can be improved by using together the phosphorus-containing compound (C) and the flame retardant (D) used in the present invention, it is possible to decrease the amount of flame retardant (D) used. This can prevent the physical properties of cured resin from decreasing when the resin composition of the present invention should be flame-retardant.

With regard to the blending amount of the phosphorus-containing compound (C) in the epoxy resin composition of the present invention, it is preferable that, the phosphorus content contained in the aforementioned phosphorus-containing compound (C) is 0.1 to 20.0 percent by mass relative to the total amount of the epoxy resin (A), the curing agent (B), the phosphorus-containing compound (C) and the flame retardant (D) (in this regard, when the component (D) is not used, the amount of (D) is 0), but 0.2 to 5.0 percent by mass is more preferable. When the phosphorus content is less than 0.1 percent by mass, the flame retardancy of the epoxy resin composition may be markedly decreased. In contrast, when the phosphorus content is more than 20.0 percent by mass, the water resistance of the epoxy resin composition may be markedly decreased.

The method for manufacturing the phosphorus-containing compound of the component (C) is not limited in particular. The phosphorus-containing compound used in the present invention can be manufactured by using a base together in the solvent, for example, according to the method indicated in the following general scheme (4).

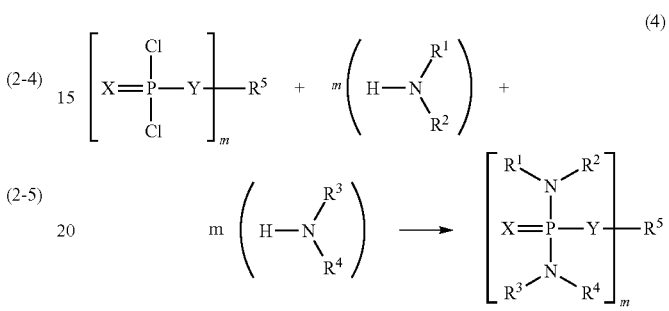

(4)

wherein, m is an integer from 2 to 10, $R^1$ to $R^4$ each independently indicate a hydrogen atom, an alkyl group or an aryl group, $R^5$ indicates a hydrocarbon group which may contain an oxygen atom, a sulfur atom, or a nitrogen atom, X indicates an oxygen atom or a sulfur atom, Y indicates an oxygen atom, a sulfur atom or $—NR^6—$, and $R^6$ indicates a hydrogen atom, an alkyl group or an aryl group.

Examples of the base used in the method indicated by the aforementioned general scheme (4) are, for example, tertiary amines such as triethylamine, tributylamine, diazabicycloundecene, diazabicyclononene and 1,4-diazabicyclo[2.2.2]octane; pyridines such as pyridine and N,N-dimethylaminopyridine; imidazoles such as 1-methylimidazole; phosphines such as triphenyl phosphine, tributyl phosphine and tricyclohexyl phosphine. In the present invention, it is preferable to use the tertiary amine among these bases, but it is most preferable to use the triethylamine.

Examples of the solvents used in the method indicated by the aforementioned general scheme (4) are, for example, ketones such as methylethylketone, methylamylketone, diethylketone, acetone, methyl isopropylketone, propylene glycol monomethyl ether acetate and cyclohexanone; ethers such as tetrahydrofuran, 1,2-dimethoxyethane, 1,2-diethoxyethane, propylene glycol monomethyl ether; esters such as ethyl acetate and n-butyl acetate; aromatic hydrocarbons such as benzene, toluene and xylene; halogenated aliphatic hydrocarbons such as carbon tetrachloride, chloroform, trichloroethylene and methylene chloride; and halogenated aromatic hydrocarbons such as chlorobenzene. It is preferable to use ethers or halogenated aliphatic hydrocarbons among these solvents, but it is particularly preferable to use ethers.

It is preferable that the reaction indicated by the aforementioned general scheme (4) is carried out under the condition that the reaction temperature ranges from −80° C. to 100° C., preferably from −50° C. to 50° C., during 0.5 to 72 hours, preferably during 1 to 24 hours. Thus the phosphorus-containing compound of the component (C) can be easily manufactured.

The flame retardant (D) used in the present invention is not limited in particular, but examples are inorganic flame retardants such as antimony oxide and zinc borate; aromatic bromine compounds such as hexabromobenzene, decabromodiphenylethane, and ethylenebistetrabromo phthalimide; and, other than the phosphorus-containing compound (C), a phosphorus-containing compound having a phosphorus atom in a molecular frame (hereinafter referred to as "a phosphorus-containing flame retardant"). Among these, from the viewpoint of reduction of environmental burdens, it is preferable to use a phosphorus-containing flame retardant having a phosphorus atom in a molecular frame. Examples of such a phosphorus-containing flame retardant are, for example, halogen-containing phosphoric acid esters such as tris(chloroethyl) phosphate, tris(2,3-dichloropropyl) phosphate, tris(2-chloropropyl) phosphate, tris (2,3-bromopropyl) phosphate, tris(bromochloropropyl) phosphate, 2,3-dibromopropyl-2,3-chloropropyl phosphate, tris(tribromophenyl) phosphate, tris(dibromophenyl) phosphate and tris(tribromoneopentyl) phosphate; non-halogen type aliphatic phosphoric acid esters such as trimethyl phosphate, triethyl phosphate, tributyl phosphate, trioctyl phosphate and tributoxyethyl phosphate; non-halogen type aromatic phosphoric acid esters such as triphenyl phosphate, cresyl diphenyl phosphate, dicresyl phenyl phosphate, tricresyl phosphate, trixylenyl phosphate, xylenyl diphenyl phosphate, tris(isopropylphenyl) phosphate, isopropylphenyl diphenyl phosphate, diisopropylphenyl phenylphosphate, tris(trimethylphenyl) phosphate, tris(t-butylphenyl) phosphate, hydroxyphenyl diphenyl phosphate and octyl diphenyl phosphate; condensed phosphoric acid esters such as resorcinol polyphenyl phosphate, 1,3-phenylenebis(2,6-dimethyl phenyl phosphate), resorcinol poly(di-2,6-xylyl) phosphate, bisphenol A polycresyl phosphate, bisphenol A polyphenyl phosphate, hydroquinone poly(2,6-xylyl) phosphate and condensed materials thereof; phosphoric acid salts such as ammonium phosphate and melamine phosphate; condensed phosphoric acid salts such as ammonium polyphosphate and melamine polyphosphate; metallic salts of phosphinic acid such as tris(diethylphosphinic acid) aluminum salt, tris(methylethyl phosphinic acid) aluminum salt, tris(diphenyl phosphinic acid) aluminum salt, triphosphinic acid aluminum salt, bis(diethyl phosphinic acid) zinc salt, bis(methyl ethyl phosphinic acid) zinc salt, bis(diphenyl phosphinic acid) zinc salt, bis(phosphinic acid) zinc salt, bisdiethyl phosphinic acid titanium salt, tetrakis(diethyl phosphinic acid) titanium salt, bis(methylethyl phosphinic acid) titanium salt, tetrakis(methylethyl phosphinic acid) titanium salt, bis(diphenyl phosphinic acid) titanium salt, and tetrakis(diphenyl phosphinic acid) titanium salt; dialkyl phosphinic acid esters such as phenyl diphenylphosphinate, methyl diphenylphosphinate, and 9,10-dihydro-9-oxa-10-phosphaphenanthrene-10-oxide (hereinafter referred to as "HCA"); HCA-modified compounds such as an addition reaction product of HCA with acrylic acid ester, an addition reaction product of HCA with epoxy resin and an addition reaction product of HCA with hydroquinone; and phosphine oxide compounds such as diphenyl(vinyl) phosphine oxide, triphenyl phosphine oxide, trialkyl phosphine oxide and tris(hydroxyalkyl)phosphine oxide.

In the present invention, from the viewpoint of decrease of burdens on the environment, it is preferable to use a phosphorus-containing flame retardant that does not contain halogen, among the aforementioned phosphorus-containing flame retardants.

Examples of a phosphorus-containing flame retardant that does not contain halogen are a phosphorus-containing phenoxy resin (for example, PHENO TOHTO ERF-001M30 and TX-0924K30 etc. manufactured by Nippon Steel Chemical Co., Ltd.), a hydroxyl-containing phosphoric ester (for example, DAIGUARD-580 and DAIGUARD-610 etc. manufactured by DAIHACHI CHEMICAL INDUSTRY CO., LTD.), and a HCA derivative (for example, HCA-HQ, M-Ester and ME-P8 etc. manufactured by SANKO Company, Limited), which have already been marketed.

In the present invention, it is further preferable to use an ammonium polyphosphate, a melamine polyphosphate, a tris(diethylphosphinic acid) aluminum salt, a 9,10-dihydro-9-oxa-10-phosphaphenanthrene-10-oxide (HCA), a10-(2,5-dihydroxyphenyl)-9,10-dihydro-9-oxa-10-phosphaphenanthrene-10-oxide (HCA-HQ manufactured by SANKO Company, Limited), a hexaphenyl cyclotriphosphazene, or a flame retardant indicated by any of the following general formulae from (5-1) to (5-9).

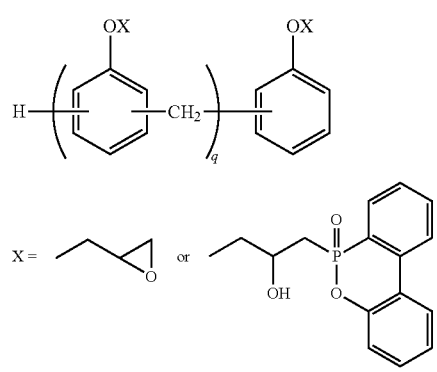

(5-1)

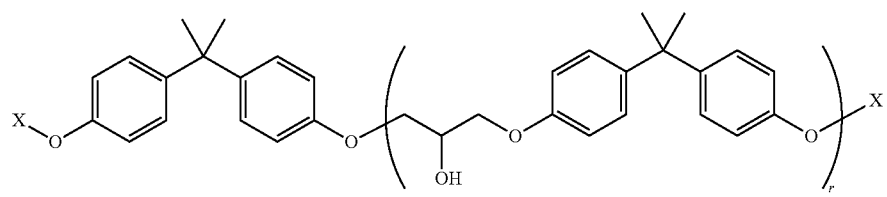

(5-2)

-continued

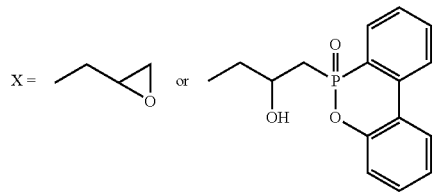

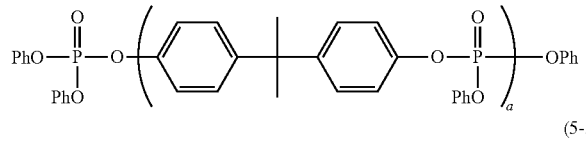
(5-3)

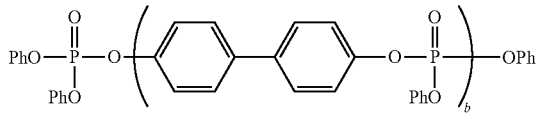
(5-4)

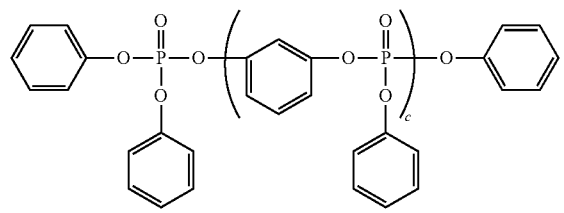
(5-5)

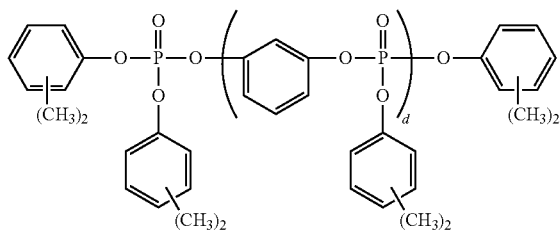
(5-6)

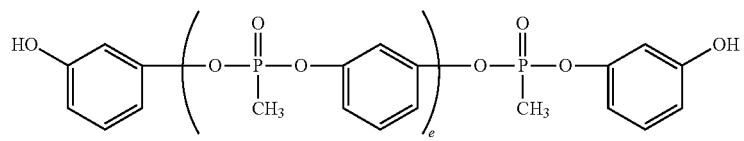
(5-7)

(5-8)

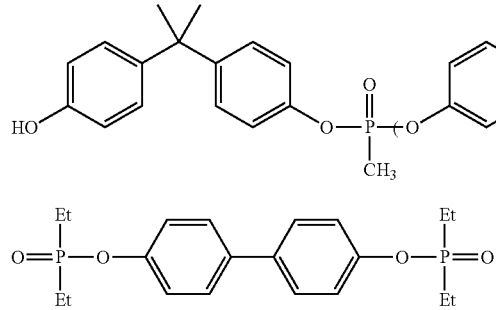
(5-9)

q is an integer from 1 to 50 in the aforementioned general formula (5-1); r is an integer from 1 to 20 in the aforementioned general formula (5-2); a, b and c are each independently an integer from 1 to 5 in the aforementioned general formulae from (5-3) to (5-5); d and e are each independently an integer from 1 to 10 in the aforementioned general formulae (5-6) and (5-7); f is an integer from 1 to 50 in the aforementioned general formula (5-8).

From the standpoint that the flame retardant effect is remarkable, tris(diethylphosphinic acid) aluminum salt and 10-(2,5-dihydroxyphenyl)-9,10-dihydro-9-oxa-10-phosphaphenanthrene-10 oxide are particularly preferable to use, among the aforementioned phosphorus-containing flame retardant.

The aforementioned phosphorus-containing flame retardants may be used alone, or two or more of them may be used together. With respect to the blending amount of the flame retardant (D) used in the present invention, the phosphorus content derived from the flame retardant (D) ranges from 0.1 to 20.0 percent by mass relative to the total amount of epoxy resin (A), curing agent (B), phosphorus-containing compound (C) and flame retardant (D). From the standpoint of the balance between the flame retardancy and physical properties of cured material of the epoxy resin composition, it is preferable that it ranges from 0.3 to 10.0 percent by mass, but 0.5 to 5.0 percent by mass is even more preferable.

An organic solvent can be used as a viscosity modifier for the epoxy resin composition of the present invention, if necessary. Examples of organic solvent in this case are amides such as N,N-dimethyl formamide, ethers such as ethyleneglycol monomethylether, ketones such as acetone and methylethyl ketone, alcohols such as methanol and ethanol, aromatic hydrocarbons such as benzene and toluene. In the present invention, at least one solvent selected from among these solvents can be mixed so that the content of solvent can range from 30 to 80 percent by mass relative to the total mass of epoxy resin composition of the present invention (epoxy resin+reactive diluent+curing agent+phosphorus compound (component C and component D)+solvent).

An inorganic filler may be added to the epoxy resin composition of the present invention, if necessary. Examples of such inorganic filler are, for example, silica such as molten silica and crystalline silica, powder of magnesium hydroxide, aluminum hydroxide, zinc borate, zinc molybdate, calcium carbonate, silicon nitride, silicon carbide, boron nitride, calcium silicate, potassium titanate, aluminum nitride, beryllia, zirconia, zircon, forsterite, steatite, spinel, mullite and titania, or beads thereof in globular form, and glass fiber. These inorganic fillers may be used alone or two or more of them may be used together.

In the present invention, it is preferable to vary the aforementioned inorganic fillers used, case by case, depending on use applications.

As for an application of laminated plate, it is preferable to use molten silica and aluminum hydroxide. As for an application of a sealing agent, it is preferable to use molten silica and crystalline silica, but it is particularly preferable to use molten silica. As for an application of a cast molding material, it is preferable to use molten silica, crystalline silica or aluminum hydroxide etc., but it is particularly preferable to use molten silica.

It is preferable that the blending amount of the aforementioned inorganic filler ranges from 20 to 90 percent by mass relative to the total solid content of the epoxy resin composition, but it is more preferable that it ranges from 25 to 80 percent by mass. When the blending amount of the inorganic filler is less than 20 percent by mass, the decreasing effect of the thermal expansion coefficient of a cured material tends to become low. When it is more than 90 percent by mass, the viscosity of the epoxy resin composition increases, therefore, the workability tends to decrease.

An additive agent other than the aforementioned inorganic filler may be used together to the epoxy resin composition of the present invention, if necessary. Examples of the above additive agent are, for example, unreactive diluents (plasticizers) such as dioctyl phthalate, dibutyl phthalate, benzyl alcohol and coal tar; fibrous fillers such as glass fiber, pulp fiber, synthetic fiber and ceramic fiber; reinforcing agents such as glass cloth.aramid cloth and carbon fiber; pigment; silane coupling agents such as γ-aminopropyl triethoxysilane, N-β-(aminoethyl)-γ-aminopropyl triethoxysilane, N-β-(aminoethyl)-N'-β-(aminoethyl)-γ-aminopropyl triethoxysilane, γ-anilinopropyl triethoxysilane, γ-glycidoxypropyl triethoxysilane, β-(3,4-epoxy cyclohexyl)ethyl triethoxysilane, vinyl triethoxysilane, N-β-(N-vinylbenzylaminoethyl)-γ-aminopropyl triethoxysilane, γ-methacryloxy propyl trimethoxy silane, γ-chloropropyl trimethoxy silane and γ-mercaptopropyl trimethoxy silane; lubricants such as candelilla wax, carnauba wax, Japan wax, insect wax, bees wax, lanolin, spermaceti, montan wax, petroleum wax, aliphatic wax aliphatic ester, aliphatic ether, aromatic ester and aromatic ether; a thickening agent; a thixotropic agent; an antioxidant; a light stabilizer; an ultraviolet absorber; an antifoaming agent; an antirust agent, colloidal silica and colloidal alumina. In the present invention, adhesive resins such as xylene resin and petroleum resin can be used together.

Generally, the amount of the aforementioned additive agent in "the total solid content" of epoxy resin composition of the present invention is 5 or less percent by mass, which is inconsiderable.

The epoxy resin composition of the present invention can be used for a laminated plate used for an electronic circuit substrate; a sealing agent, a cast molding material, a film material, an adhesive agent, an electrical insulating paint, a composite material requiring flame retardancy and a powdery paint which are used for electronic parts, and in particular, it is preferable to be used for a laminated plate used for an electronic circuit substrate, and a sealing agent and a cast molding material used for electronic parts.

The laminated plate of the present invention can be manufactured according to the following procedure: one or predetermined numbers of prepregs made of the epoxy resin composition of the present invention, for example, 2 to 20 prepregs are overlapped, then metallic foils such as copper and aluminum are arranged on one side or on both sides thereof to laminate. After that, the thermal compression bonding is carried out at a given temperature, for example, 100 to 250° C., by using a multistep press or a multistep vacuum press etc.

The aforementioned prepregs using the epoxy resin composition of the present invention can be manufactured by impregnating or by applying the epoxy resin composition of the present invention to a substrate, then by semi-curing (B stage) by means of heating etc.

As the substrates used for the aforementioned prepregs, a conventional substrate, for examples, a glass fiber, an organic fiber such as a polyimide fiber, polyester fiber and tetrafluoroethylene fiber, and mixed-fibers thereof can be used.

Examples of the form of these substrates are, for example, woven cloth, nonwoven cloth, roving, chopped strand mat, and surfacing mat. The quality of material and form of these substrates are selected depending on use applications and performances of a molded material aimed at. If necessary, one material having one quality thereof and one form can be selected alone or two or more of materials having different qualities and/or different forms can be selected and used in combination.

The sealing agent of the present invention used for electronic parts can be manufactured by stirring, melting, mixing and dispersing the epoxy resin composition of the present invention, while heat-treating, if necessary. In this case, apparatus used for stirring, melting, mixing and dispersing are not limited in particular. In the present invention, a grinder provided with a stirring apparatus and a heating device, a triple roll mill, a ball mill, a planetary mixer, and a beads mill etc. can be used. Also, these apparatuses may be used in combination as appropriate.

For example, the cast molding material using the epoxy resin composition of the present invention can be manufactured by using the epoxy resin composition together with a mold, wherein the composition is obtained by mixing the epoxy resin composition of the present invention using a mixer etc., and then the vacuum defoaming is carried out.

Now, the present invention will be illustrated in greater detail by reference to the following examples and comparative examples. However, the present invention should not be construed as being limited to these examples.

In this regard, unless otherwise noted, "%" in the following examples and comparative examples is based on mass standard. Also, with respect to the appearance of prepreg by visual observation, the uniform appearance was evaluated as good, and the non-uniform appearance was evaluated as poor. Similarly, the appearance of double-side copper-clad laminated plate, which was manufactured by pressure curing through the use of a prepreg, was visually observed and evaluated. A prepreg molded uniformly by curing was evaluated as having a good moldability, and a prepreg molded non-uniformly by curing was evaluated as having a poor moldability.

With respect to the flame retardancy, a test piece (127 mm long×12.7 mm wide) obtained by removing the copper foil of double-side copper-clad laminated plate through an etching process, was tested according to "Test for Flammability of Plastic Materials UL 94" of the UL (Underwriters Laboratories) and the evaluation was performed as described below.

<Evaluation Method>

A test piece was maintained vertically and a burner flame was brought to contact with the lower end of the test piece for 10 seconds, then the burner flame was taken away to measure the time until the fire of the test piece went out. Next, as soon as the fire went out, the second burner flame contact was carried out for 10 seconds. In the same manner as the first-time burner flame contact, the time until the fire of the test piece went out was measured. After carrying out these operations for five test pieces, the average value of the time until the first fire of each test piece went out (hereinafter, referred to as T1) and the average value of the time until the second fire of each test piece went out (hereinafter, referred to as T2) were calculated. At the same time, the total burning time of these five operations was calculated. In addition, it was evaluated at the same time whether the cotton put under the test piece began to burn or not, because of the dropping flash point.

From the results of total burning time and the facts whether the cotton began to burn or not etc., the burning rank was evaluated according to UL-94V standard. V-0 of the burning level is the best. The flame retardancy becomes lower as the burning level changes to V-1 and V-2 in turn. In this regard, the burning rank that does not correspond to any level of V-0 to V-2 was determined as NR.

The glass-transition temperature of a cured material was measured by using the TMA (EXSTAR TMA/SS-6100: a thermal mechanical analyzer manufactured by Hitachi High-Tech Science Corporation). On the other hand, the peeling strength of copper foil was measured according to the JIS C 6481 5.7.

Manufacturing Example 1: A
Phosphorus-Containing Compound (C-1)

<Synthesis of a Phosphorus-Containing Chloride P-1>

22.8 g (0.1 mol) of bisphenol A, 306.7 g (2.0 mol) of phosphoryl chloride and 0.3 g (3.0 mmol) of anhydrous magnesium chloride were introduced in a 300 ml round-bottom flask provided with a rotator, a reflux condenser, a thermometer and a nitrogen gas feed inlet, and heating was carried out until the prepared reacting solution was refluxed, while stirring for 24 hours. At this time, the hydrogen chloride gas generated by the reaction was introduced into sodium hydroxide water solution, from an upper part of the reflux condenser, to trap it. After the reaction was finished, the excessive phosphoryl chloride was removed by using an evaporator to obtain the phosphorus-containing chloride P-1. The obtained P-1 was dissolved in 100 ml of THF to obtain a THF solution of P-1.

<Reaction of the Obtained Chloride with Amine>

210 ml of THF solution of methyl amine (2.0 mol/L, methyl amine: 0.42 mol) and 42.5 g (0.42 mol) of triethyl amine were introduced in a 500 ml round-bottom flask equipped with an agitating blade, a reflux condenser, a drip funnel and a thermometer. Under a nitrogen atmosphere, the aforementioned THF solution of P-1 was dripped into the prepared solution so that a reaction temperature was not beyond 0° C., wherein the reacting solution was stirred and cooled. After finishing the dripping, stirring was continued at 25° C. for 24 hours. After the reaction was finished, the solvent and the excessive row materials were removed by using an evaporator and a residue was dissolved with 300 ml of chloroform to move it into a separating funnel. Washing was carried out with 100 ml of distilled water twice. The organic layer was dried with anhydrous magnesium sulfate and then the solvent was removed with an evaporator to obtain 18.8 g (yield: 85.3%) of phosphorus-containing compound (C-1). The theoretical phosphorus content of phosphorus-containing compound (C-1) is 14.1 percent by mass.

Manufacturing Example 2: A
Phosphorus-Containing Compound (C-2)

<Synthesis of a Phosphorus-Containing Chloride P-2>

14.9 g (80 mmol) of 4,4'-biphenol, 245.3 g (1600 mmol) of phosphoryl chloride and 0.2 g (2.4 mmol) of anhydrous magnesium chloride were introduced in a 300 ml round-bottom flask provided with a rotator, a reflux condenser, a thermometer and a nitrogen gas feed inlet, then heating was carried out until the reacting solution was refluxed, and stirring was also carried out for 24 hours. At this time, the hydrogen chloride gas generated by the reaction was introduced into the sodium hydroxide water solution from an upper part of the reflux condenser, to trap it. After the reaction was finished, the excessive phosphoryl chloride was removed by using an evaporator to obtain the phosphorus-containing chloride P-2. The obtained P-2 was dissolved in 80 ml of THF to obtain a THF solution of P-2.

<Reaction of the Obtained Chloride P-2 with Amine>

170 ml of THF solution of methyl amine (2.0 mol/L, methyl amine: 0.34 mol) and 34.4 g (0.34 mol) of triethyl amine were introduced in a 500 ml round-bottom flask equipped with an agitating blade, a reflux condenser, a drip funnel and a thermometer. Under a nitrogen atmosphere, the aforementioned THF solution of P-2 was dripped into the prepared solution, while it was stirred and cooled so that a reaction temperature was not beyond 0° C. After finishing the dripping, the reacting solution was stirred for 24 hours. After the reaction was finished, the solvent and the excessive raw materials were removed by using an evaporator and a residue was dissolved with 300 ml of chloroform to move it into a separating funnel. Washing was carried out with 100 ml of distilled water twice, then the organic layer was dried with anhydrous magnesium sulfate and the solvent was removed with an evaporator to obtain 5.4 g (yield: 16.9%) of phosphorus-containing compound (C-2). The theoretical phosphorus content of the phosphorus-containing compound (C-2) is 15.5 percent by mass.

Manufacturing Example 3: A
Phosphorus-Containing Flame Retardant (D-1)

29.8 g (0.16 mol) of 4,4'-biphenol, 34.4 g (0.34 mol) of triethyl amine and 300 ml of super dehydrated tetrahydrofuran were introduced into a 500 ml five-necked flask, which was equipped with an agitating blade, a reflux condenser, a thermometer, a drip funnel and a septum, and was dried and substituted with nitrogen gas sufficiently. 47.8 g (0.34 mol) of diethyl phosphinic chloride was introduced into the drip funnel and dripping was carried out so that a reaction temperature was not beyond 50° C. After finishing the dripping, obtained reacting solution was stirred overnight. Then, the reacting solution was moved into a separating funnel and 500 ml of chloroform and 300 ml of saturated sodium bicarbonate solution were added, then the mixture was stirred well. After separating oil and water, the water layer was removed. The organic layer was washed with 200 ml of distilled water twice, and further was dried with anhydrous magnesium sulfate. After that, the solvent was removed with an evaporator to obtain 60.6 g (yield: 96.1%)

of phosphorus-containing flame retardant (D-1). The theoretical phosphorus content of phosphorus-containing flame retardant (D-1) is 15.7 percent by mass.

Manufacturing Example 4: A Phosphorus-Containing Compound (C-3)

<Synthesis of a Phosphorus-Containing Chloride P-4>

14.3 g (0.13 mol) of resorcinol, 398.7 g (2.6 mol) of phosphoryl chloride and 0.4 g (3.9 mmol) of anhydrous magnesium chloride were introduced into a 300 ml round-bottom flask provided with an rotator, a reflux condenser, a thermometer and a nitrogen gas feed inlet, and the prepared reacting solution was heated until it was refluxed, then the reacting solution was further stirred for 24 hours. At this time, the hydrogen chloride gas generated by the reaction was introduced into the sodium hydroxide water solution from an upper part of the reflux condenser, to trap it. After the reaction was finished, the excessive phosphoryl chloride was removed by using an evaporator to obtain the phosphorus-containing chloride P-4. The obtained P-4 was dissolved in 100 ml of THF to obtain a THF solution of P-4.

<Reaction of Chloride P-4 with Amine>

224 ml of THF solution of methyl amine (2.0 mol/L, methyl amine: 0.52 mol) and 52.6 g (0.52 mol) of triethyl amine were introduced into a 500 ml round-bottom flask equipped with an agitating blade, a reflux condenser, a drip funnel and a thermometer. Under a nitrogen atmosphere, the aforementioned THF solution of P-4 was dripped into the prepared reaction solution so that a reaction temperature was not beyond 0° C., while the reacting solution was stirred and cooled. After finishing the dripping, stirring was carried out at 25° C. for 24 hours. After the reaction was completed, the solvent and the excessive raw materials were removed by using an evaporator and the obtained residue was dissolved with 300 ml of chloroform to move it into a separating funnel. Washing was carried out with 100 ml of distilled water twice. The organic layer was dried with anhydrous magnesium sulfate and then the solvent was removed with an evaporator to obtain 26.0 g (yield: 62.1%) of phosphorus-containing compound (C-3). The theoretical phosphorus content of phosphorus-containing compound (C-3) is 19.2 percent by mass.

Manufacturing Example 5: A Phosphorus-Containing Flame Retardant (D-2)

245 ml of THF solution containing methyl amine (2.0 mol/L, methyl amine: 0.57 mol) and 57.7 g (0.57 mol) of triethyl amine were introduced in a 500 ml round-bottom flask equipped with an agitating blade, a reflux condenser, a drip funnel and a thermometer. Under a nitrogen atmosphere, 57.0 g (0.27 mol) of phenyl dichlorophosphate was dripped into the prepared solution, which was stirred and cooled so that a reaction temperature could not be beyond 0° C. After finishing the dripping, stirring was carried out at 25° C. for 24 hours. After the reaction was completed, the solvent and excessive raw materials were removed from the solution by using an evaporator. The residue obtained was dissolved with 300 ml of chloroform and moved into a separating funnel. Washing was carried out with 100 ml of distilled water twice. The organic layer was dried with anhydrous magnesium sulfate and then the solvent was removed with an evaporator to obtain 15.1 g (yield: 27.9%) of phosphorus-containing flame retardant (D-2). The theoretical phosphorus content of phosphorus-containing flame retardant (D-2) is 15.5 percent by mass.

Manufacturing Example 6: A Phosphorus-Containing Compound (C-4)

<Synthesis of a Phosphorus-Containing Chloride P-6>

16.0 g (80 mmol) of bisphenol F, 245.3 g (1600 mmol) of phosphoryl chloride and 0.2 g (2.4 mmol) of anhydrous magnesium chloride were introduced in a 300 ml round-bottom flask provided with a rotator, a reflux condenser, a thermometer and a nitrogen feed inlet. The prepared solution was heated until the solution was refluxed, and the solution was stirred for 24 hours. At this time, the hydrogen chloride gas generated by the reaction was introduced into the sodium hydroxide water solution from an upper part of reflux condenser in order to trap the hydrogen chloride. After the reaction was completed, the excessive phosphoryl chloride was removed by using an evaporator to obtain the phosphorus-containing chloride P-6. The obtained P-6 was dissolved in 80 ml of THF to obtain a THF solution of P-6.

<Reaction of the Obtained Chloride with Amine>

170 ml of THF solution of methyl amine (2.0 mol/L, methyl amine: 0.34 mol) and 34.4 g (0.34 mol) of triethyl amine were introduced in a 500 ml round-bottom flask equipped with an agitating blade, a reflux condenser, a drip funnel and a thermometer. Under a nitrogen atmosphere, the aforementioned THF solution of P-6 was dripped into the prepared solution while stirring and cooling so that a reaction temperature could not be beyond 0° C. After finishing the dripping, the reacting solution was stirred for 24 hours. After the reaction was completed, the solvent and the excessive raw materials were removed by using an evaporator. The obtained residue was dissolved with 300 ml of chloroform, and it was moved into a separating funnel. Washing was carried out with 100 ml of distilled water twice. The organic layer was dried with anhydrous magnesium sulfate and then the solvent was removed with an evaporator to obtain 25.2 g (yield: 76.4%) of phosphorus-containing compound (C-4). The theoretical phosphorus content of phosphorus-containing compound (C-4) is 14.8 percent by mass.

Example 1

49.1 g of EOCN-1045 (cresol novolac type epoxy resin manufactured by NIPPON KAYAKU Co., Ltd), 61.5 g of HP-350 (aluminum hydroxide manufactured by SHOWA DENKO K.K.) and 61.5 g of SFP-130MC (spherical silica manufactured by Denka Company Limited) were added to 100 g of methyl ethyl ketone and the mixture thereof was dispersed with a triple roll mill. Next, 18.0 g of phosphorus-containing compound (1-1) obtained in Manufacturing example 1 was dissolved in 20 g of methanol and was added to the mixture. Furthermore, 50.9 g of EOCN-1045, 5 g (5 phr: 5 parts by mass relative to 100 parts by mass of epoxy resin) of ADEKA HARDENER EH-3636AS (a dicyandiamide type latent curing agent manufactured by ADEKA CORPORATION), and 100 g of methyl ethyl ketone were added. The mixture thereof was dispersed with a disperser to manufacture a resin varnish.

The obtained resin varnish was impregnated in glass cloth (#7628 manufactured by Nitto Boseki Co., Ltd.) and was dried by heating in a circulating hot air oven at 120° C. for 10 minutes to manufacture a prepreg. At this time, the amount of resin in the prepreg was 40 to 50 percent by mass of the entire prepreg. Then, four sheets of prepreg manufactured were overlapped, copper foils 35 μm thick (manufactured by FUKUDA METAL FOIL & POWDER Co., LTD.) were arranged on both sides of the prepreg and the thermal compression bonding was carried out at 190° C. under the pressure condition of 10 Kg/cm² for 120 minutes to obtain a double-side copper-clad laminated plate. Physical properties of the double-side copper-clad laminated plate manufactured as above were shown in Table 1.

Examples from 2 to 4 and Comparative Examples from 1 to 5

The double-side copper-clad laminated plate was manufactured in the same way as Example 1, except that the blending was carried out according to the composition described in Table 1 and various evaluations were made. Results were shown in Table 1.

TABLE 1

|  | Exam. 1 | Exam. 2 | Exam. 3 | Exam. 4 | Comp. Exam. 1 | Comp. Exam. 2 | Comp. Exam. 3 | Comp. Exam. 4 | Comp. Exam. 5 |
|---|---|---|---|---|---|---|---|---|---|
| EOCN-104S | 100 | 100 | 100 | 100 | 100 | 100 | 100 | 100 | 100 |
| EH-3636AS | 5 | 5 | 5 | 5 | 5 | 5 | 5 | 5 | 5 |
| Phosphorus-containing compound (C-1) | 18.0 | | | | | | | | |
| Phosphorus-containing compound (C-2) | | 15.9 | | | | | | | |
| Phosphorus-containing flame retardant (D-1) | | | | | 13.7 | | | | |
| Phosphorus-containing compound (C-3) | | | 12.2 | | | | | | |
| Phosphorus-containing flame retardant (D-2) | | | | | | | | | 15.5 |
| Phosphorus-containing compound (C-4) | | | | 16.4 | | | | | |
| HCA-HQ*¹ | | | | | | | 27.5 | | |
| FP-600*² | | | | | | | | 30.4 | |
| HP-350 | 61.5 | 60.8 | 58.6 | 60.7 | 59.3 | 65.7 | 52.5 | 52.5 | 60.3 |
| SFP-130MC | 61.5 | 60.8 | 58.6 | 60.7 | 59.3 | 65.7 | 52.5 | 52.5 | 60.3 |
| Appearance of prepreg | Good | Good | Good | Good | Good | Poor | Good | Good | Good |
| Molding properties | Good | Good | Good | Good | Good | — | Poor | Good | Good |
| Tg (° C.) | 190 | 190 | 189 | 189 | 181 | — | — | 178 | 176 |
| Flame retardancy (UL-94) | NR | V-1 | NR | V-1 | V-1 | — | — | NR | NR |
| T1 (second) | 40.2 | 26.9 | 31.7 | 19.0 | 8.1 | | | 33.9 | 42.3 |
| T2 (second) | 6.9 | 1.0 | 6.6 | 2.0 | 13.7 | | | 0 | 0.8 |
| Total burning time (second) | 235.6 | 139.6 | 191.8 | 104.6 | 59.0 | | | 169.3 | 215.1 |
| Peeling strength of copper foil | 1.37 | 1.17 | 1.33 | 1.42 | 1.33 | — | — | 1.38 | 1.15 |

*¹HCA-HQ: a flame retardant indicated by the following general formula (5), manufactured by SANKO Company, Limited

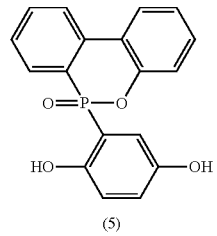

(5)

*²FP-600: a flame retardant indicated by the following general formula (6), manufactured by ADEKA CORPORATION

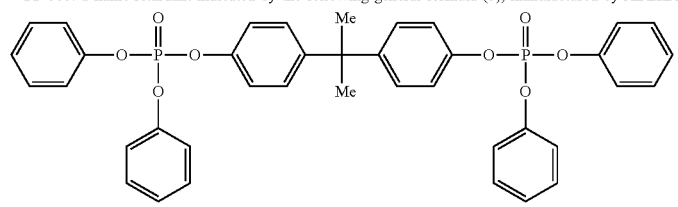

(6)

As is clear from the results of Table 1, it was confirmed that the cured material obtained by curing the epoxy resin composition of the present composition was highly improved in Tg, and also the prepreg using these compositions as well as workability and molding properties when the laminated plate using said prepreg was manufactured were good. In addition, it was confirmed that, although a flame retardant was not used together in the present examples, the flame retardancy was evaluated as good especially in Examples 2 and 4.

In contrast to this, in Comparative example 1, it was confirmed that, although a certain degree of effect in flame retardancy was seen, satisfactory results in Tg could not be obtained. Further, in Comparative example 2, since the phosphorus-containing flame retardant (HCA-HQ) which was used when a prepreg was manufactured was crystallized, a uniform prepreg could not be obtained and as a result, it was impossible to evaluate afterward.

In Comparative example 3, a uniform laminated plate could not be obtained, for the reason that a component which seems to be the phosphorus-containing flame retardant (FP-600) was partially separated in the pressure curing process performed when the double-side copper-clad laminated plate was manufactured, and as a result, it was impossible to evaluate afterward. Moreover, in Comparative examples 4 and 5, it was confirmed that good evaluations in any of flame retardancy or Tg could not be obtained.

Examples from 5 to 9

<Examples Wherein the Flame Retardant was Used Together>

As shown in Table 2, the double-side copper-clad laminated plates were manufactured in the same way as Example 1, except that the flame retardant was used together, and various evaluations were carried out. Results were shown in Table 2

As is clear from the results of Table 2, it was confirmed that the prepreg using the cured material obtained by curing the epoxy resin composition, containing a flame retardant together, of the present invention and the laminated plate using said prepreg were excellent in workability and molding properties and also were remarkably improved in flame retardancy. In addition, it was also confirmed that, even in the case of reducing the amount of flame retardant used compared with Example 5, like Examples 6 and 7, those prepregs and laminated plates showed good flame retardancy.

INDUSTRIAL APPLICABILITY

The epoxy resin composition of the present invention has excellent environmental adaptability due to nonuse of halogen. In addition, due to use of a phosphorous-containing compound having two or more reaction points with an epoxy group of epoxy resin, the cured material obtained by curing the epoxy resin composition of the present invention can be highly improved in Tg and also the epoxy resin composition of the present invention has excellent workability. The laminated plate etc. manufactured by using the epoxy resin composition of the present invention are excellent in physical properties such as thermal resistance. Therefore, the present invention is extremely useful in the industrial field.

The invention claimed is:

1. An epoxy resin composition comprising: an epoxy resin (A), a curing agent (B) and a phosphorous-containing compound (C) indicated by the following general formula (1);

TABLE 2

|  | Exam. 5 | Exam. 6 | Exam. 7 | Exam. 8 | Exam. 9 |
| --- | --- | --- | --- | --- | --- |
| EOCN-104S | 100 | 100 | 100 | 100 | 100 |
| EH-3636AS | 5 | 5 | 5 | 5 | 5 |
| Phosphorus-containing compound (component (C)) (C-1) | 10.7 | 9.32 |  | 8.88 | 8.41 |
| Phosphorus-containing compound (component (C)) (C-4) |  |  | 8.57 |  |  |
| Phosphorus-containing flame retardant (component (D)) (D-1) |  |  |  | 7.75 |  |
| HCA-HQ (component (D)) | 30.6 | 13.4 | 13.3 |  |  |
| OP-1230*3 (component (D)) |  |  |  |  | 5.15 |
| HP-350 | 73.2 | 63.9 | 63.4 | 60.8 | 59.3 |
| SFP-130MC | 73.2 | 63.9 | 63.4 | 60.8 | 59.3 |
| Phosphorus content derived from phosphorus-containing compound (I-1, I-3 or I-6) (%) | 1.0 | 1.0 | 1.0 | 1.0 | 1.0 |
| Phosphorus content derived from flame retardant (%) | 2.0 | 1.0 | 1.0 | 1.0 | 1.0 |
| Appearance of prepreg | Good | Good | Good | Good | Good |
| Molding properties | Good | Good | Good | Good | Good |
| Tg (° C.) | 181 | 183 | 189 | 170 | 198 |
| Flame retardancy (UL-94) | V-0 | V-0 | V-0 | V-0 | V-0 |
| T1 (second) | 0.9 | 4.0 | 4.6 | 3.8 | 1.4 |
| T2 (second) | 1.1 | 0.8 | 3.1 | 2.8 | 0.6 |
| Total burning time (second) | 9.9 | 24.2 | 38.4 | 32.7 | 9.9 |

*3tris(diethylphosphinic acid) aluminum salt manufactured by CLARIANT Co. Ltd.

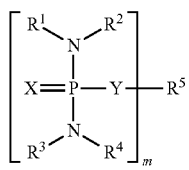

(1)

wherein m indicates an integer from 2 to 10, $R^1$ to $R^4$ each independently indicate a hydrogen atom, an alkyl group or an aryl group, $R^5$ indicates a hydrocarbon group that may contain an oxygen atom, a sulfur atom or a nitrogen atom, X indicates an oxygen atom or a sulfur atom, Y indicates an oxygen atom, a sulfur atom or —$NR^6$—, and $R^6$ indicates a hydrogen atom, an alkyl group or an aryl group and either $R^1$ or $R^2$ is a hydrogen atom and the other is an alkyl group or aryl group and at the same time, either of $R^3$ or $R^4$ is a hydrogen atom and the other is an alkyl group or aryl group.

2. The epoxy resin composition according to claim 1, wherein X and Y in the aforementioned general formula (1) are both oxygen atoms.

3. The epoxy resin composition according to claim 1, wherein $R^5$ in the aforementioned general formula (1) is a hydrocarbon group having one aromatic ring or more than two aromatic rings.

4. The epoxy resin composition according to claim 1, wherein $R^1$ to $R^4$ in the aforementioned general formula (1) are each independently a hydrogen atom or an alkyl group having 1 to 6 carbon atoms, $R^5$ is a functional group having any of structures selected from the following general formulae (2-1), (2-2), (2-4), (2-5) and (2-6);

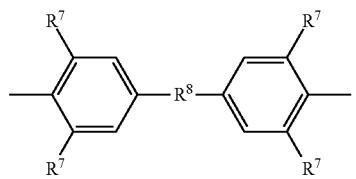

(2-1)

wherein $R^7$ indicates a hydrogen atom or an alkyl group having 1 to 4 carbon atoms, $R^8$ indicates a single bond, a methylene group, or —$C(CH_3)_2$—, and $R^9$ and $R^{10}$ each independently indicate a hydrogen atom or an alkyl group having 1 to 6 carbon atoms,

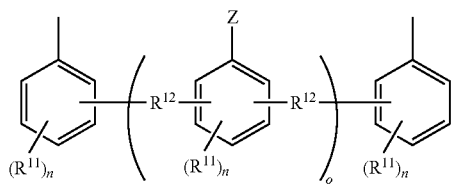

(2-2)

wherein n indicates an integer from 0 to 3, o indicates an integer from 0 to 50, $R^{11}$ indicates a hydrogen atom or an alkyl group having 1 to 4 carbon atoms, $R^{12}$ indicates a hydrocarbon group which may contain an oxygen atom or a sulfur atom, and Z is a hydroxyl group or a functional group indicated by the following general formula (2-3),

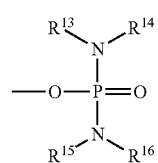

(2-3)

wherein $R^{13}$ to $R^{16}$ each independently indicate a hydrogen atom, or an alkyl group having 1 to 6 carbon atoms,

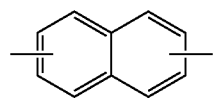

(2-4)

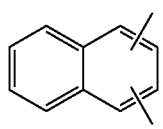

(2-5)

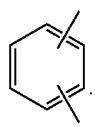

(2-6)

5. The epoxy resin composition according to claim 4, wherein the aforementioned $R^5$ is a functional group indicated by the aforementioned formula (2-1), and the aforementioned $R^7$ is a hydrogen atom.

6. The epoxy resin composition according to claim 1, wherein a flame retardant (D) is contained; wherein, said flame retardant (D) is at least one of flame retardants selected from groups comprising an inorganic flame retardant, an aromatic bromine compound and a phosphorous-containing flame retardant except for the phosphorous-containing compound (C).

7. The epoxy resin composition according to claim 6, wherein the flame retardant (D) is a phosphorous-containing flame retardant that does not contain halogen.

8. A prepreg comprising a sheet-like substrate made of at least one of fibers selected from inorganic fibers and organic fibers, and the epoxy resin composition according to claim 1.

9. A method for manufacturing an epoxy resin laminated plate, wherein metallic foils are arranged to laminate on at least one surface of a prepreg according to claim 8 or a laminated body obtained by laminating two or more said prepregs, and the thermal compression bonding is carried out.

10. An epoxy resin laminated plate manufactured by the method according to claim 9.

* * * * *